United States Patent
Lee (10) Patent No.: US 7,376,103 B2
(45) Date of Patent: May 20, 2008

(54) METHOD FOR PROCESSING A HANDOFF IN A MOBILE COMMUNICATION TERMINAL

(75) Inventor: Yong-Hwan Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 986 days.

(21) Appl. No.: 10/423,781

(22) Filed: Apr. 25, 2003

(65) Prior Publication Data

US 2003/0202489 A1    Oct. 30, 2003

(30) Foreign Application Priority Data

Apr. 27, 2002 (KR) .............................. P2002-23249

(51) Int. Cl.
*H04Q 7/00* (2006.01)
*H04Q 7/20* (2006.01)
*H04J 3/16* (2006.01)

(52) U.S. Cl. ............... 370/332; 370/465; 455/439; 455/442

(58) Field of Classification Search ............... None
See application file for complete search history.

(56) References Cited

U.S. PATENT DOCUMENTS

| | | | | |
|---|---|---|---|---|
| 5,153,909 | A * | 10/1992 | Beckle et al. | 379/265.03 |
| 6,760,772 | B2 * | 7/2004 | Zou et al. | 709/230 |
| 6,855,866 | B1 * | 2/2005 | Weterings et al. | 800/287 |
| 2002/0027891 | A1 * | 3/2002 | Mimura | 370/331 |

* cited by examiner

*Primary Examiner*—Nittaya Juntima
(74) *Attorney, Agent, or Firm*—The Farrell Law Firm, PC (57) ABSTRACT

A method for processing a handoff in a mobile communication terminal. If a handoff direction message received from a base station is a hard handoff direction message, the mobile communication terminal transmits an acknowledgement message to the base station in response to the handoff direction message and then performs a hard handoff. If the handoff direction message received from the base station is a soft handoff direction message, the mobile communication terminal performs a soft handoff, incorporates an acknowledgement message into a soft handoff completion message when the soft handoff is completed, and transmits the soft handoff completion message containing the acknowledgement message to the base station.

10 Claims, 6 Drawing Sheets

METHOD FOR PROCESSING A HANDOFF IN A MOBILE COMMUNICATION TERMINAL

PRIORITY

This application claims priority to an application entitled "METHOD FOR PROCESSING HANDOFF IN MOBILE COMMUNICATION TERMINAL", filed in the Korean Industrial Property Office on Apr. 27, 2002 and assigned Serial No. 2002-23249, the contents of which are hereby incorporated by reference.

BACKGROUND OF THE INVENTION

1. Field of the Invention

The present invention relates to a method for processing a handoff in a mobile communication system, and more particularly to a method for processing a handoff in a mobile communication terminal.

2. Description of the Related Art

Conventionally, the term "handoff" means a function for continuing a call by automatically coupling a mobile communication terminal from a traffic channel of a radio cell to another traffic channel of another radio cell when a subscriber of the mobile communication terminal moves from the radio cell to another radio cell.

In a mobile communication system based on a CDMA (Code Division Multiple Access), the handoff is divided into a hard handoff, a soft handoff, and a softer handoff. The hard handoff is performed when the mobile communication terminal moves between base stations using different frequencies. In this case, an instantaneous call cutoff can occur in a call connection state, but the call can be coupled to another base station next to a corresponding base station so quickly that a caller does not experience any inconvenience during communicating with a called party. The soft handoff is performed when the mobile communication terminal moves between base stations using a same frequency. Because the mobile communication terminal moving between the base stations uses the same frequency in the soft handoff, it does not affect the call. The softer handoff is performed when the mobile communication terminal moves between sectors located within one radio cell being covered by a base station. The procedure of processing the softer handoff is similar to the procedure of processing the soft handoff.

Figure 1:
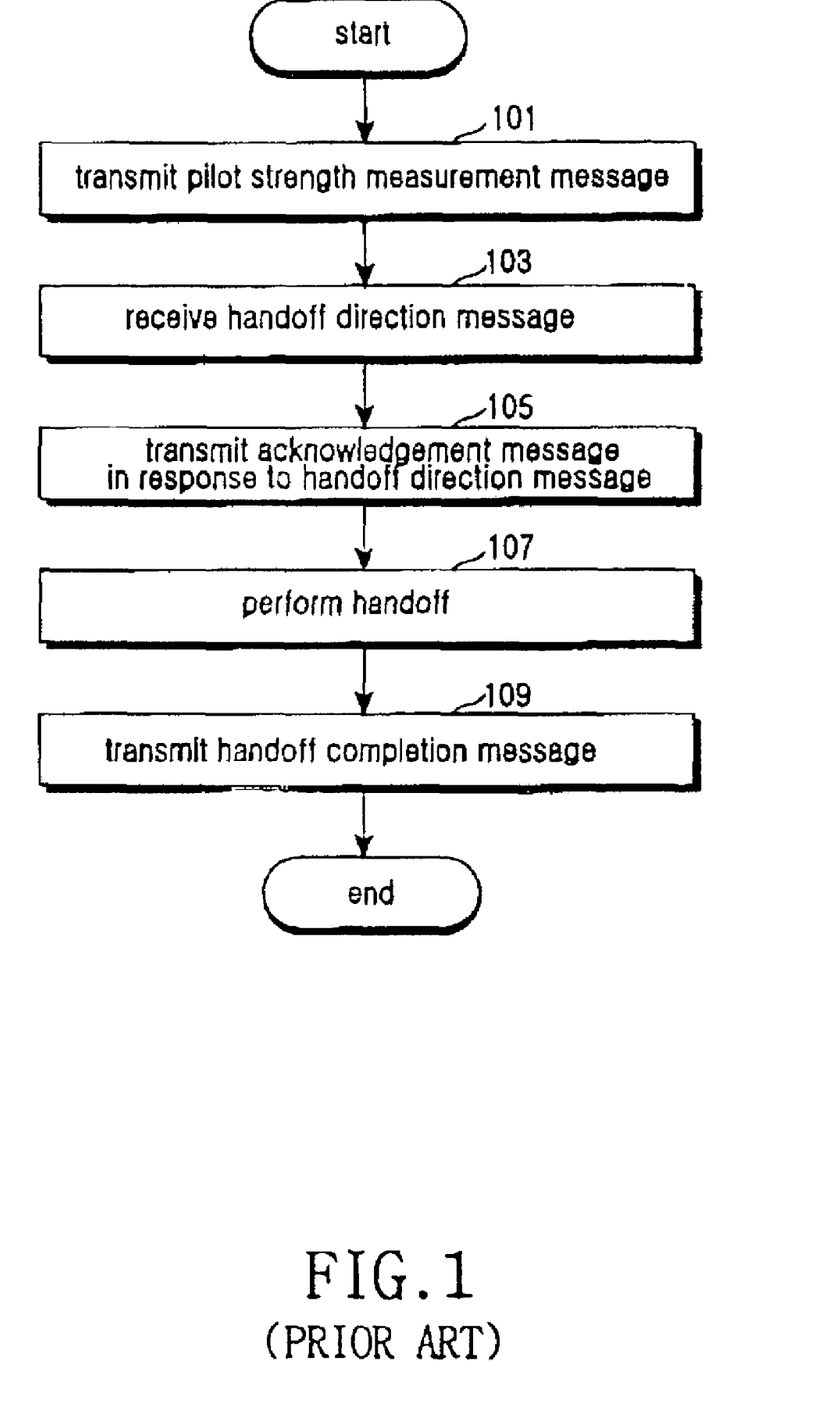
FIG. 1 is a flow chart illustrating a conventional handoff processing procedure in a mobile communication terminal.

The handoffs described above are performed between the base stations and the mobile communication terminal. A procedure of transmitting and receiving messages in a conventional handoff will be described with reference to FIG. 1. FIG. 1 is a flow chart illustrating an operation of the mobile communication terminal according to a conventional handoff process. First, the mobile communication terminal transmits a pilot strength measurement message to a base station to which the mobile communication terminal belongs in step 101. In response to the pilot strength measurement message, the base station transmits a handoff direction message to the mobile communication terminal. The mobile communication terminal receives the handoff direction message from the base station in step 103. In response to the handoff direction message, the mobile communication terminal always transmits an acknowledgement message to the base station in step 105. The mobile communication terminal is coupled to a new base station or its traffic channel to perform the handoff in step 107. The mobile communication terminal transmits a handoff completion message to the base station in step 109 and then the handoff ends.

As an improvement of an initial handoff, the conventional handoff as the FIG. 1 has improved the initial handoff by carrying the acknowledgement message with the handoff completion message after the mobile communication terminal receives the handoff direction message.

The above-described, conventional handoff may have some degree of merit in view of power saving when used in a soft handoff, but it has a drawback of having frequent call drops when used in a hard handoff, because after Tx is disabled to make a frequency change and then enabled to a new frequency, in case of the hard handoff, the call drop is frequently caused when transmitting a handoff completion message (HCM), mostly due to differences in system design rules.

The conventional procedure of processing the handoff as illustrated in FIG. 1 reduces a call drop rate when the hard handoff is performed, but does not work perfectly, due to differences in the system design rules. In addition, there is a problem in that the conventional procedure can cause unnecessary power consumption and over load by unconditionally transmitting an acknowledgement message when the soft handoff is performed.

Further, a so-called Fast Acknowledgement system, which was first adopted in an IS-2000 system, has introduced an improved system of transmitting an acknowledgement message immediately in an Rx/Tx (Reception/Transmission) (Layer 2) task after a mobile terminal has received a handoff Direction Message (HDM). This Fast Acknowledgement system may efficiently eliminate such call drop phenomena by disabling Tx before transmitting of an Acknowledgement message to a base station in the hard handoff in between frequencies, the Acknowledgement message being sent from a Main Control (MC) (Layer 3) task. However, the Fast Acknowledgement system still has some disadvantages in view of a power saving and overhead, because the Acknowledgement message is unconditionally transmitted irrespective of whether the Acknowledgement message from the Rx/Tx task is soft handoff or hard handoff, and no validation to the message is performed.

SUMMARY OF THE INVENTION

Therefore, the present invention has been designed in view of the above problems, and it is an object of the present invention to provide a method for processing a handoff capable of reducing power consumption of a mobile communication terminal.

It is another object of the present invention to provide a method for effectively processing a handoff and reducing handoff process time in a mobile communication terminal.

In accordance with an aspect of the present invention, the above and other objects can be accomplished by a method for processing a handoff in a mobile communication terminal, comprising the steps of: a) transmitting a pilot strength measurement message to a base station to which the mobile communication terminal belongs; b) receiving a handoff direction message from the base station; c) determining whether the handoff direction message is a hard handoff direction message or a soft handoff direction message; d) transmitting an acknowledgement message to the base station in response to the handoff direction message, if the handoff direction message is a hard handoff direction message, performing a hard handoff, and transmitting a hard handoff completion message to the base station, if the hard handoff is completed; and e) performing a soft handoff, if the handoff direction message is a soft handoff direction message, and transmitting a soft handoff completion message to the base station, if the soft handoff is completed.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the drawings, same or similar elements are denoted by the same reference numerals even though they are depicted in different drawings. In the following description, a detailed description of known functions and configurations incorporated herein will be omitted when it may make the subject matter of the present invention rather unclear.

Figure 2:
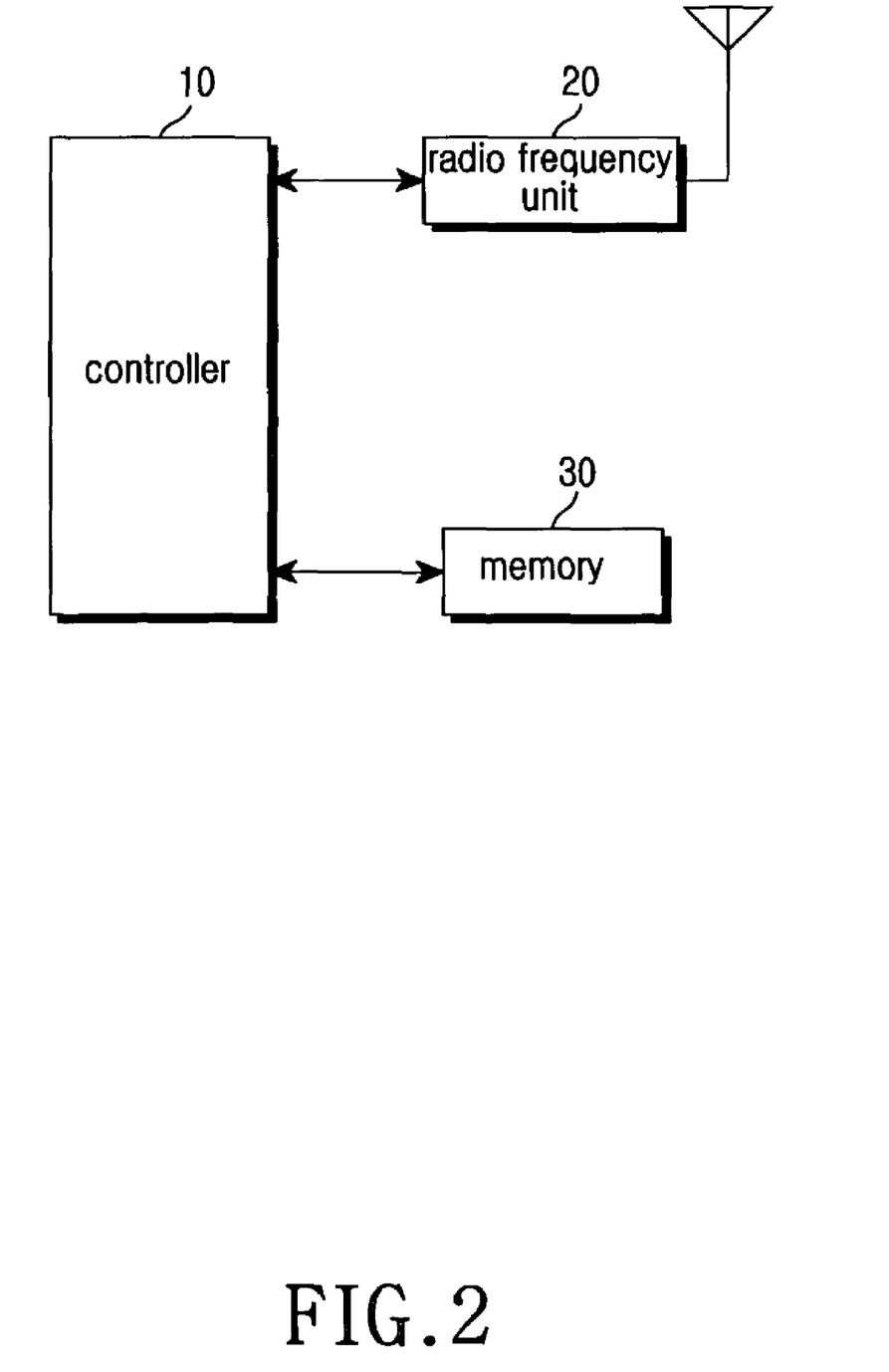
FIG. 2 is a view illustrating a configuration of a mobile communication terminal applied to the present invention.

In accordance with the present invention, a mobile communication terminal performs different handoffs according to a type of a handoff. First, the configuration of the mobile communication terminal applied to the present invention will be described with reference to FIG. 2. FIG. 2 illustrates a configuration of a mobile communication terminal applied to the present invention. As illustrated in FIG. 2, the mobile communication terminal includes a controller 10, a radio frequency unit 20, and a memory 30. The controller 10 performs an overall control of the mobile communication terminal. The memory 30 stores program data needed for controlling the operation of the mobile communication terminal. The memory 30 further stores data while the mobile communication terminal is controlled and operated. The memory 30 furthermore stores program data needed for performing the handoff. The radio frequency unit 20 modulates and demodulates a radio signal containing voice data or control data to be received through an antenna under control of the controller 10. The radio frequency unit 20 includes a Rake receiver (not shown) having a plurality of fingers, a searcher, a combiner, etc. The searcher detects pilot signals from a plurality of base station signals received from a base station to which the mobile communication terminal belongs and a peripheral base station, and then measures strengths of the pilot signals.

Figure 3:
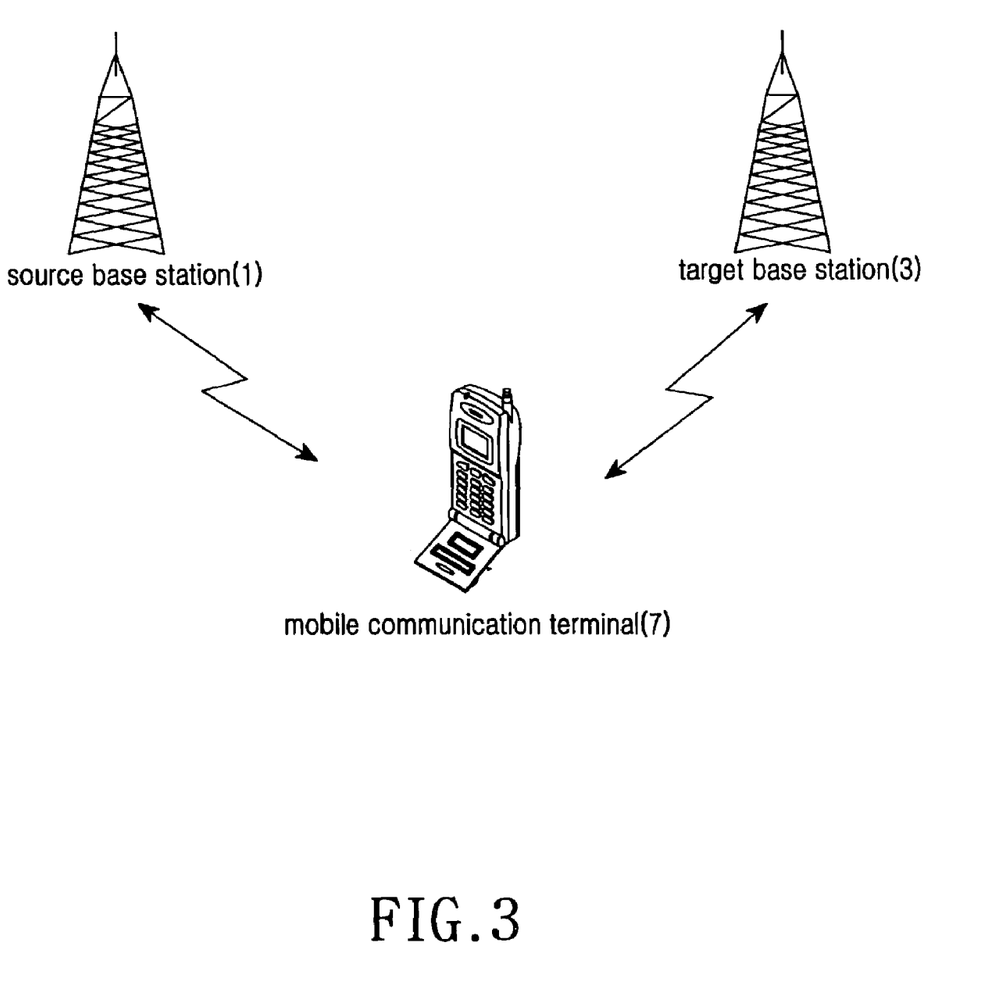
FIG. 3 is a view illustrating a relationship between the mobile communication terminal and base stations when a handoff is performed.

When the mobile communication terminal 7 described above is positioned within an overlay cell being in contact with radio cells as illustrated in FIG. 3, it simultaneously receives base station signals from a source base station (BS) 1 to which the mobile communication terminal 7 belongs and a target base station (BS) 3 adjacent to the source base station 1. FIG. 3 is a view illustrating a relationship between the mobile communication terminal 7 and the base stations 1 and 3. The controller 10 of the mobile communication terminal 7 detects pilot signals from base station signals received from the base stations 1 and 3, and then measures strengths of the pilot signals. If a strength of the pilot signal received from the target base station 3 is greater than a predetermined strength, the mobile communication terminal 7 transmits a pilot strength measurement message corresponding to the pilot signal received from the target base station 3 to the source base station 1 to which the mobile communication terminal 7 belongs. After the source base station 1 receives the pilot strength measurement message and identifies a state of the target base station 3, it determines whether the handoff is possible. If the handoff is possible, the source base station 1 transmits a handoff direction message to the mobile communication terminal 7. When a field value contained in the handoff direction message is valid, the controller 10 of the mobile communication terminal 7 determines whether the handoff direction message is a soft handoff direction message or a softer handoff direction message. If the handoff direction message is a soft handoff direction message or a softer handoff direction message, the controller 10 performs an operation of the soft handoff or the softer handoff and then transmits a handoff completion message to the source base station 1. On the other hand, if the handoff direction message is a hard handoff direction message, the controller 10 transmits an acknowledgement message to the source base station 1 and then performs an operation of the hard handoff. Thereafter, when the handoff is completed, the controller 10 transmits the handoff completion message to the source base station 1.

Figure 4:
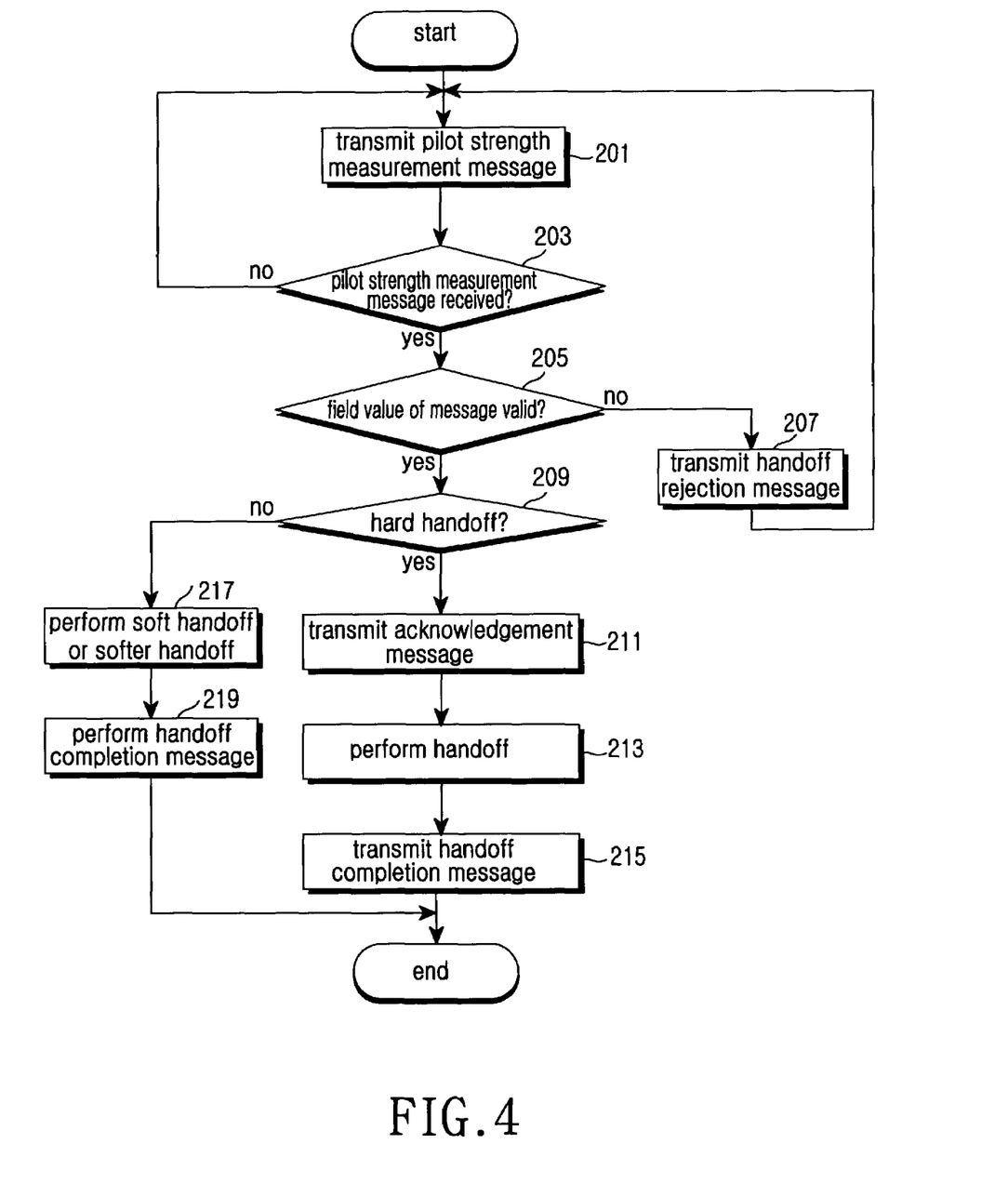
FIG. 4 is a flow chart illustrating an operation of the mobile communication terminal in accordance with the present invention.

FIG. 4 is a flow chart illustrating an operation of a mobile communication terminal according to the handoff described above. Referring to FIG. 4, if the controller 10 determines that a strength of a pilot signal received from the target base station 3 is greater than a predetermined strength, the controller 10 transmits a pilot strength measurement message to the source base station 1 to which the mobile communication terminal 7 belongs in step 201. Thereafter, if the controller 10 receives a handoff direction message from the source base station 1 in step 203, it proceeds to step 205. On the other hand, if the controller 10 fails to receive the handoff direction message, it repeats the above step 201. The controller 10 determines in step 205 whether a field value contained in the handoff direction message is valid. If the field value is valid, the controller 10 proceeds to step 209. On the other hand, if the field value is not valid, the controller 10 proceeds to step 207. The controller 10 transmits a handoff rejection message to the source base station 1 in step 207 and then returns to step 201.

In step 209, the controller 10 analyzes the handoff direction message because it is valid. If the handoff direction message is a hard handoff direction message, the controller 10 proceeds to step 211. On the other hand, if the handoff direction message is not a hard handoff direction message, the controller 10 proceeds to step 217. In response to the handoff direction message, the controller 10 transmits an acknowledgement message in step 211 and then proceeds to step 213. The controller 10 terminates a traffic channel coupled to the source base station 1 to perform the hard handoff in step 213. At this time, the traffic channel is coupled to the target base station 3 so quickly that a caller party does not experience inconvenience during communicating with a called party. When the hard handoff is completed, the controller 10 transmits a handoff completion message to the source base station 1 in step 215.

On the other hand, if the handoff direction message is not the hard handoff direction message but a soft handoff direction message or a softer handoff direction message at the determination in step 209, the controller 10 performs the soft handoff or the softer handoff in step 217. In other words, if the handoff direction message is the soft handoff direction message, the mobile communication terminal 7 is simultaneously coupled to traffic channels of the two base stations 1 and 3. Thereafter, a traffic channel of the source base station 1 is terminated. Further, if the handoff direction message is the softer handoff direction message, the mobile communication terminal 7 is coupled to traffic channels of two sectors. Thereafter, the mobile communication terminal 7 is coupled to only a traffic channel of a destination sector into which the mobile communication terminal 7 newly enters. When the soft handoff or the softer handoff is completed, the controller 10 transmits a handoff completion message incorporating an acknowledgement message to the source base station 1 in step 219.

Figure 5:
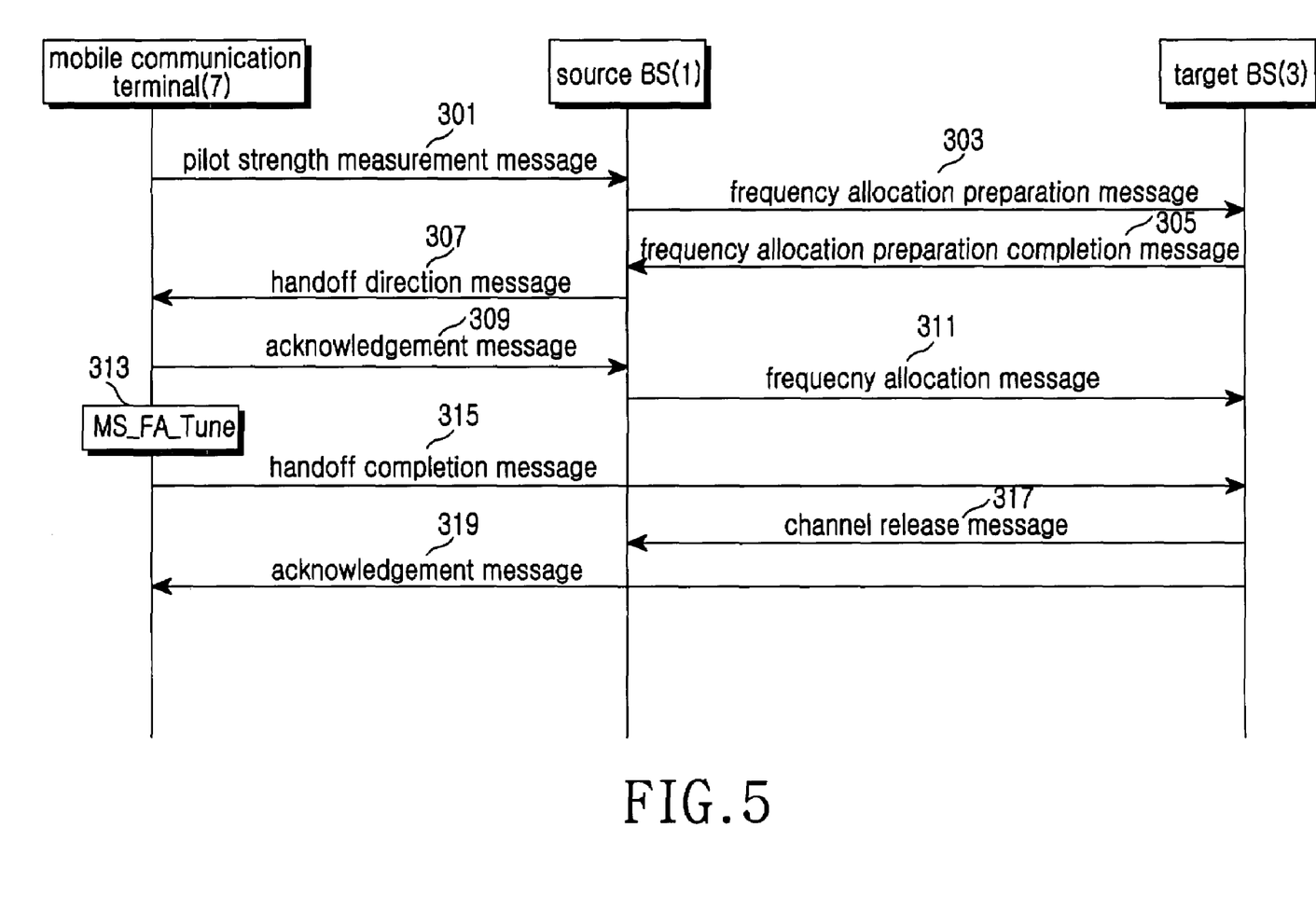
FIG. 5 is a view illustrating a flow of messages between a mobile communication terminal and base stations when a hard handoff is performed.
Figure 6:
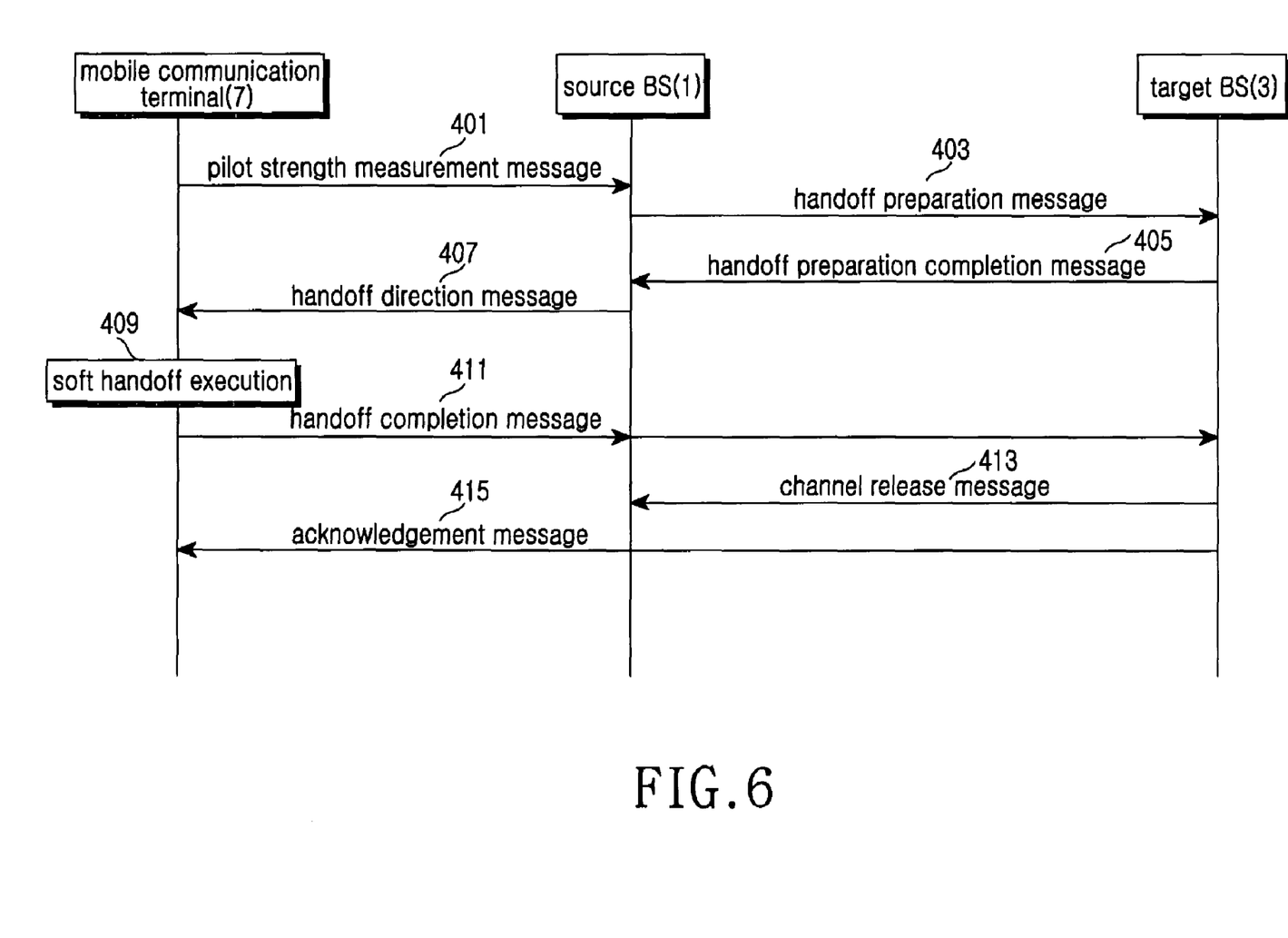
FIG. 6 is a view illustrating a flow of messages between a mobile communication terminal and base stations when a soft handoff is performed.

A message transmission and reception procedure between the mobile communication terminal 7 and the base stations 1 and 3 on the basis of the handoff procedure described above will be described with reference to FIGS. 5 and 6. FIG. 5 is a view illustrating a flow of messages between the mobile communication terminal 7 and the base stations 1 and 3 when a hard handoff is performed, and FIG. 6 is a view illustrating a flow of messages between the mobile communication terminal 7 and the base stations 1 and 3 when a soft handoff is performed.

Referring to FIG. 5, the mobile communication terminal 7 transmits a pilot strength measurement message to the source base station 1 in step 301. The source base station 1 receiving the pilot strength measurement message identifies a state of the target base station 3. The source base station 1 determines whether a hard handoff or a soft handoff should be performed. If the hard handoff should be performed, the source base station 1 transmits a frequency allocation preparation message to the target base station 3 in step 303. When the target base station 3 receiving the frequency allocation preparation message completes a frequency allocation preparation for the mobile communication terminal 7, the target base station 3 transmits a frequency allocation preparation completion message to the source base station 1 in step 305. The source base station 1 receiving the frequency allocation preparation completion message transmits a handoff direction message for directing a hard handoff to the mobile communication terminal 7 in step 307. The mobile communication terminal 7 receiving the handoff direction message performs steps 203 to 209 illustrated in FIG. 4 and then transmits an acknowledgement message to the source base station 1 in response to the handoff direction message in step 309. If the source base station 1 receives the acknowledgement message, it transmits a frequency allocation message to the target base station 3 in step 311. The mobile communication terminal performs the hard handoff with a channel of a frequency allocated from the target base station 3 in step 313 and then transmits a handoff completion message to the target base station 3 in step 315. If the target base station 3 receives the handoff completion message, it transmits a channel release message to the source base station 1 in step 317. The source base station 1 receiving the channel release message releases the channel coupled to the mobile communication terminal 7. Thereafter, the target base station 3 transmits an acknowledgement message to the mobile communication terminal 7 in step 319 and then the hard handoff ends.

Next, a message transmission and reception procedure between the mobile communication terminal 7 and the base stations 1 and 3 on the basis of a soft handoff procedure will be described with reference to FIG. 6. The mobile communication terminal 7 transmits a pilot strength measurement message to the source base station 1 in step 401. The source base station 1 transmits a handoff preparation message to the target base station 3 in step 403. When the target base station 3 completes a handoff preparation, the source base station 1 transmits a handoff preparation completion message in step 405. If the source base station 1 receives the handoff preparation completion message, it transmits a handoff direction message for directing a soft handoff to the mobile communication terminal 7 at step 407. The mobile communication terminal 7 receiving the handoff direction message performs the soft handoff at step 409 like the procedure illustrated in FIG. 4, it proceeds to step 411. The mobile communication terminal 7 transmits a handoff completion message to the source base station 1 and the target base station 3 in step 411. At this time, the handoff completion message contains an acknowledgement message to the handoff direction message. The target base station 3 receiving the handoff completion message transmits a channel release message to the source base station 1 in step 413. The source base station 1 receiving the channel release message releases a channel coupled to the mobile communication terminal 7. Thereafter, the target base station 3 transmits an acknowledgement message to the mobile communication terminal 7 in step 415 and then the handoff ends.

In summary, when the mobile communication terminal according to the present invention receives a handoff direction message, the mobile communication terminal determines whether the handoff direction message is a soft/softer handoff or a hard handoff if message fields values are valid in TxRx (a Layer 2 task), and if the handoff direction message is soft/softer handoff and the message fields values are valid, the mobile communication terminal does not transmit an acknowledgement message, thereby reducing power consumption. In addition, if the handoff direction message is hard handoff and the message field's values are valid, the mobile communication terminal transmits a fast acknowledgement message to effectively perform a fast hard handoff without a call drop. Further, if the message fields values are not valid, the mobile communication terminal transmits a mobile station reject order in Layer 2 so that overheads are reduced, as compared with the conventional method in which the mobile station reject order is transmitted in Layer 3.

As is apparent from the above description, the present invention provides a method for processing a handoff in a mobile communication terminal, which performs different handoff operations on the basis of a type of a handoff, thereby effectively processing the handoff and reducing power consumption of the mobile communication terminal.

Although preferred embodiments of the present invention have been disclosed for illustrative purposes, those skilled in the art will appreciate that various modifications, additions, and substitutions are possible, without departing from the scope of the invention. Therefore, the present invention is not limited to the above-described embodiments, but the present invention is defined by the following claims, along with their full scope of equivalents.

What is claimed is:

1. A method for processing a handoff in a mobile communication terminal, comprising the steps of:
   a) transmitting a pilot strength measurement message to a base station to which the mobile communication terminal belongs;
   b) receiving a handoff direction message from the base station;
   c) determining whether the handoff direction message is a hard handoff direction message or a soft handoff direction message;
   c-1) immediately transmitting an acknowledgement message to the base station only if the handoff direction message is a hard handoff direction message;
   d) if the handoff direction message is a hard handoff direction message, performing a hard handoff, and transmitting a hard handoff completion message to the base station if the hard handoff is completed; and
   e) if the handoff direction message is a soft handoff direction message, performing a soft handoff and transmitting a soft handoff completion message to the base station if the soft handoff is completed.

2. The method as set forth in claim 1, further comprising the step of:
   f) performing a softer handoff if the handoff direction message is a softer handoff direction message, and transmitting a softer handoff completion message to the base station if the softer handoff is completed.

3. A method for processing a handoff in a mobile communication system, comprising the steps of:
   a) transmitting a pilot strength measurement message to a base station to which a mobile communication terminal belongs;
   b) transmitting a handoff direction message on the basis of the pilot strength measurement message from the base station to the mobile communication terminal;
   c) analyzing the handoff direction message if the mobile communication terminal receives the handoff direction message;
   d) immediately transmitting an acknowledgement message from the mobile communication terminal to the base station in response to the handoff direction message only if the handoff direction message is a hard handoff direction message;
   e) performing a hard handoff and transmitting a hard handoff completion message from the mobile communication terminal to the base station if the hard handoff is completed;
   f) performing a soft handoff if the handoff direction message is a soft handoff direction message in step c); and
   g) transmitting a soft handoff completion message to the base station if the soft handoff is completed.

4. The method as set forth in claim 3, wherein the step c) comprises:
   c1) verifying whether a field value of the handoff direction message is valid; and
   c2) determining a handoff type from the handoff direction message if the field value is valid.

5. The method as set forth in claim 4, wherein the step c) further comprises:
   c3) transmitting a handoff rejection message to the base station if the field value is not valid.

6. The method as set forth in claim 3, wherein the soft handoff completion message includes an acknowledgment message.

7. The method as set forth in claim 3, further comprising the steps of:
   h) performing a softer handoff if the handoff direction message is a softer handoff direction message in step c); and
   i) transmitting a softer handoff completion message to the base station if the softer handoff is completed.

8. The method as set forth in claim 7, wherein the softer handoff completion message includes an acknowledgment message.

9. A mobile communication terminal, comprising:
   a radio frequency unit for receiving a handoff direction message from a base station; and
   a controller for determining a transmitting mode of an acknowledgement message according to a type of handoff message to be performed depending upon the handoff direction message,
   wherein, if the handoff message type is a hard handoff, the controller immediately transmits an acknowledgement message for the handoff direction message to the base station, and if the handoff message type is a soft or a softer handoff, the controller transmits an acknowledgement message together with a handoff completion message to the based station upon a completion of handoff.

10. The mobile communication terminal as set forth in claim 9, wherein the controller determines whether the handoff direction message is valid, and if not valid, transmits a handoff rejection message to the base station.

* * * * *